US 11,590,930 B1

United States Patent
Bracken et al.

(10) Patent No.: US 11,590,930 B1
(45) Date of Patent: Feb. 28, 2023

(54) VEHICLE SYSTEMS FOR VERIFYING PASSENGER PROTECTIVE EQUIPMENT AND METHODS FOR USING THE SAME

(71) Applicant: Toyota Motor North America, Inc., Plano, TX (US)

(72) Inventors: Daniel C. Bracken, Frisco, TX (US); Joshua Batie, Frisco, TX (US); Michael D. Dorazio, Santa Monica, CA (US); Randy Kaushek, Rancho Santa Margarita, CA (US)

(73) Assignee: Toyota Motor North America, Inc., Plano, TX (US)

( * ) Notice: Subject to any disclaimer, the term of this patent is extended or adjusted under 35 U.S.C. 154(b) by 0 days.

(21) Appl. No.: 17/459,990

(22) Filed: Aug. 27, 2021

(51) Int. Cl.
*G06V 20/56* (2022.01)
*B60R 25/25* (2013.01)
*B60R 25/30* (2013.01)
*B60R 25/01* (2013.01)

(52) U.S. Cl.
CPC .............. *B60R 25/01* (2013.01); *B60R 25/25* (2013.01); *B60R 25/30* (2013.01); *G06V 20/56* (2022.01)

(58) Field of Classification Search
CPC ......... B60R 25/30; B60R 25/25; B60R 25/01; G06V 20/56
See application file for complete search history.

(56) References Cited

U.S. PATENT DOCUMENTS

| 8,725,311 B1 * | 5/2014 | Breed | A61B 5/11 |
| | | | 701/1 |
| 10,173,687 B2 | 1/2019 | Sham | |
| 10,308,257 B2 | 6/2019 | Kundu | |
| 10,414,377 B2 | 9/2019 | Hoyos et al. | |
| 10,532,658 B2 | 1/2020 | Kim et al. | |
| 10,556,568 B2 | 2/2020 | Boehm | |

(Continued)

FOREIGN PATENT DOCUMENTS

| CN | 102147835 A | 8/2011 |
| CN | 104613549 B | 7/2017 |

(Continued)

OTHER PUBLICATIONS

Automatic systems' temperature, mask detection and people counting solutions (https://securityupdate.in/automatic-system-systems-temperature-mask-detection-and-people-counting-solutions/) Aug. 1, 2020, 1 page.

(Continued)

*Primary Examiner* — Thomas D Alunkal

(74) *Attorney, Agent, or Firm* — Dinsmore & Shohl LLP

(57) ABSTRACT

A vehicle system includes a detection device structurally configured to capture an image, a door lock, where the door lock is positionable between a locked position and an unlocked position, a controller communicatively coupled to the detection device and the door lock, the controller including a processor and a non-transitory computer readable and executable instruction set, which when executed, causes the processor to receive a captured image of a user from the detection device, determine whether the captured image of includes protective equipment worn by the user, and direct the door lock to move into the unlocked position in response to determining that the protective equipment in the captured image meets a configurable protective equipment baseline.

15 Claims, 6 Drawing Sheets

(56) References Cited

U.S. PATENT DOCUMENTS

| | | | |
|---|---|---|---|
| 10,703,204 B2 | 7/2020 | Hassan et al. | |
| 11,263,887 B1* | 3/2022 | Yamasaki | A61B 5/7405 |
| 2007/0222554 A1* | 9/2007 | Hart | G07C 9/25 |
| | | | 340/5.6 |
| 2008/0247609 A1* | 10/2008 | Feris | G06V 40/103 |
| | | | 340/506 |
| 2010/0045464 A1* | 2/2010 | Knopf | F16P 3/147 |
| | | | 340/5.1 |
| 2012/0268237 A1* | 10/2012 | Lee | E05F 15/73 |
| | | | 340/5.7 |
| 2019/0071055 A1 | 3/2019 | Luchner et al. | |
| 2019/0361437 A1 | 11/2019 | Wilson et al. | |
| 2022/0012894 A1* | 1/2022 | Lev | G06V 40/166 |

FOREIGN PATENT DOCUMENTS

| | | | |
|---|---|---|---|
| CN | 108583580 A | | 9/2018 |
| CN | 111202861 A | | 5/2020 |
| DE | 102011016777 A1 | | 10/2012 |
| KR | 20100053264 A | | 5/2010 |
| KR | 20170011703 A | | 2/2017 |
| KR | 101982594 B1 | | 5/2019 |
| KR | 20200003763 A | | 1/2020 |
| KR | 102073561 B1 | | 3/2020 |

OTHER PUBLICATIONS

Principle of access control with mask detection (https://zkteco.eu/sites/default/files/principle_of_access_control_with_mask_detection_27may20202.pdf), published May 26, 2020, 8 pages.

* cited by examiner

VEHICLE SYSTEMS FOR VERIFYING PASSENGER PROTECTIVE EQUIPMENT AND METHODS FOR USING THE SAME

TECHNICAL FIELD

The present specification generally relates to vehicle systems for verifying protective equipment utilized by prospective passengers, and methods for operating the same.

BACKGROUND

Vehicles such as automobiles, buses, and the like can be utilized to transport passengers from place to place. Some vehicles may be operated by users that are different from the passengers of the vehicle. For example, buses may be operated by a driver and may carry numerous passengers. Similarly, taxis, rideshares, and the like may be operated by a driver and may carry numerous passengers. In many vehicles, the driver and passengers are generally positioned within an interior of the vehicle.

SUMMARY

Various contagions, such as viruses and the like may be transmitted through the air and/or through contact surfaces (e.g., surfaces contacted by a person carrying the contagion). In some instances, contagions can be more readily transmitted between individuals within an interior of a vehicle, as compared to individuals spaced apart from one another in open-air environments. Additionally, contagions can be deposited on various surfaces of the vehicle as different passengers contact the various surfaces, and the contagions can subsequently transmitted to other passengers and/or the driver of the vehicle. Further, in some circumstances, the vehicle and driver may be exposed to numerous passengers, for example where the vehicle is used in public transit or is a vehicle for hire. As the number of passengers the driver and the vehicle are exposed to increases, the likelihood of coming into contact with an infected passenger increases.

To reduce the transmission of contagion between persons, protective equipment may be utilized. For example, masks covering the nose and mouth of a passenger can be effective at restricting the transmission of airborne contagion via saliva droplets. To reduce the likelihood of transmission of a contagion among passengers and between the passengers and the driver, it is desirable to verify the protective equipment worn by passengers.

Embodiments of the present application are generally directed to systems and methods for verifying passenger protective equipment. In some embodiments, vehicle systems disclosed herein may restrict access to the vehicle interior unless it can be verified that a prospective passenger is wearing appropriate protective equipment. In some embodiments, vehicle systems disclosed herein may receive biometric data and may determine an appropriate level of protective equipment based at least in part the biometric data.

In one embodiment, a vehicle system includes a detection device structurally configured to capture an image, a door lock, where the door lock is positionable between a locked position and an unlocked position, a controller communicatively coupled to the detection device and the door lock, the controller including a processor and a non-transitory computer readable and executable instruction set, which when executed, causes the processor to receive a captured image of a user from the detection device, determine whether the captured image of includes protective equipment worn by the user, and direct the door lock to move into the unlocked position in response to determining that the protective equipment in the captured image meets a configurable protective equipment baseline.

In another embodiment, a method for providing access to a vehicle, the method including capturing an image of a user with a detection device, determining whether the captured image of includes protective equipment worn by the user, and directing a door lock to move into an unlocked position in response to determining that the protective equipment in the captured image meets a configurable protective equipment baseline.

In another embodiment, a vehicle system includes a biometric sensor structurally configured to detect at least one of a user's body temperature, respiration rate, blood pressure, and blood oxygen saturation, a door lock, where the door lock is positionable between a locked position and an unlocked position, a controller communicatively coupled to the biometric sensor and the door lock, the controller includes a processor and a non-transitory computer readable and executable instruction set, which when executed, causes the processor to receive biometric data from the biometric sensor, determine a configurable protective equipment baseline based at least in part on the biometric data from the biometric sensor, and direct the door lock to move into the unlocked position based at least in part on a user meeting the configurable protective equipment baseline.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6 schematically depicts another example screen display of the remote computing device of FIG. 2, according to one or more embodiments shown and described herein;

FIG. 7 schematically depicts another example screen display of the remote computing device of FIG. 2, according to one or more embodiments shown and described herein;

DETAILED DESCRIPTION

Embodiments described herein are generally directed to vehicle systems and methods for confirming protective equipment worn by a prospective passenger. By verifying the protective equipment worn by prospective passengers, the risk associated with the transmission of contagion within the vehicle can be reduced. These and other embodiments will now be described in greater detail with reference to the figures.

Figure 1:
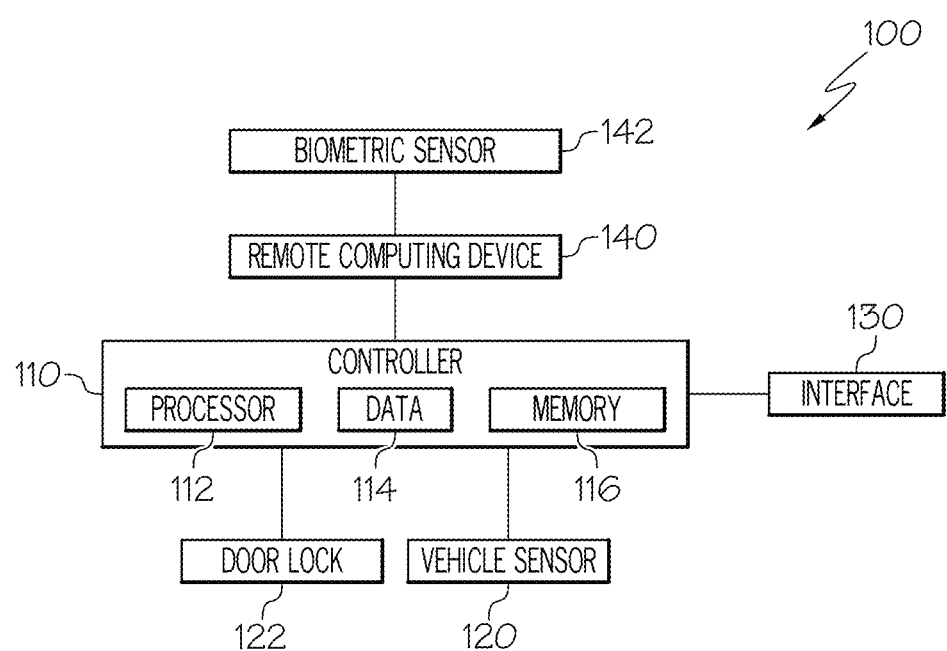
FIG. 1 schematically depicts a control diagram of a vehicle system, according to one or more embodiments shown and described herein.

Referring initially to FIG. 1 a control diagram for an example vehicle system 100 is schematically depicted. In embodiments, the vehicle system 100 includes a controller 110. The controller 110 includes a processor 112, a data storage component 114, and/or a memory component 116. The memory component 116 may be configured as volatile and/or nonvolatile memory and as such, may include random access memory (including SRAM, DRAM, and/or other types of RAM), flash memory, secure digital (SD) memory, registers, compact discs (CD), Bernoulli cartridges, digital versatile discs (DVD), and/or other types of non-transitory computer-readable mediums. Depending on the particular embodiment, these non-transitory computer-readable mediums may reside within the controller 110 and/or external to the controller 110.

The memory component 116 may store operating logic, analysis logic, and communication logic in the form of one or more computer readable and executable instruction sets. The analysis logic and the communication logic may each include a plurality of different pieces of logic, each of which may be embodied as a computer program, firmware, and/or hardware, as an example. A local interface is also included in the controller 110, and may be implemented as a bus or other communication interface to facilitate communication among the components of the controller 110.

The processor 112 may include any processing component operable to receive and execute instructions (such as from a data storage component 114 and/or the memory component 116). It should be understood that while the components in FIG. 1 are illustrated as residing within the controller 110, this is merely an example, and in some embodiments, one or more of the components may reside external to the controller 110. It should also be understood that, while the controller 110 is illustrated as a single device, this is also merely an example.

In embodiments, the controller 110 is communicatively coupled to one or more components of the vehicle system 100. For example, in the embodiment depicted in FIG. 1, the controller 110 is communicatively coupled to one or more vehicle sensors 120, one or more door locks 122, an interface 130, one or more remote computing devices 140, and one or more biometric sensors 142.

Figure 2:
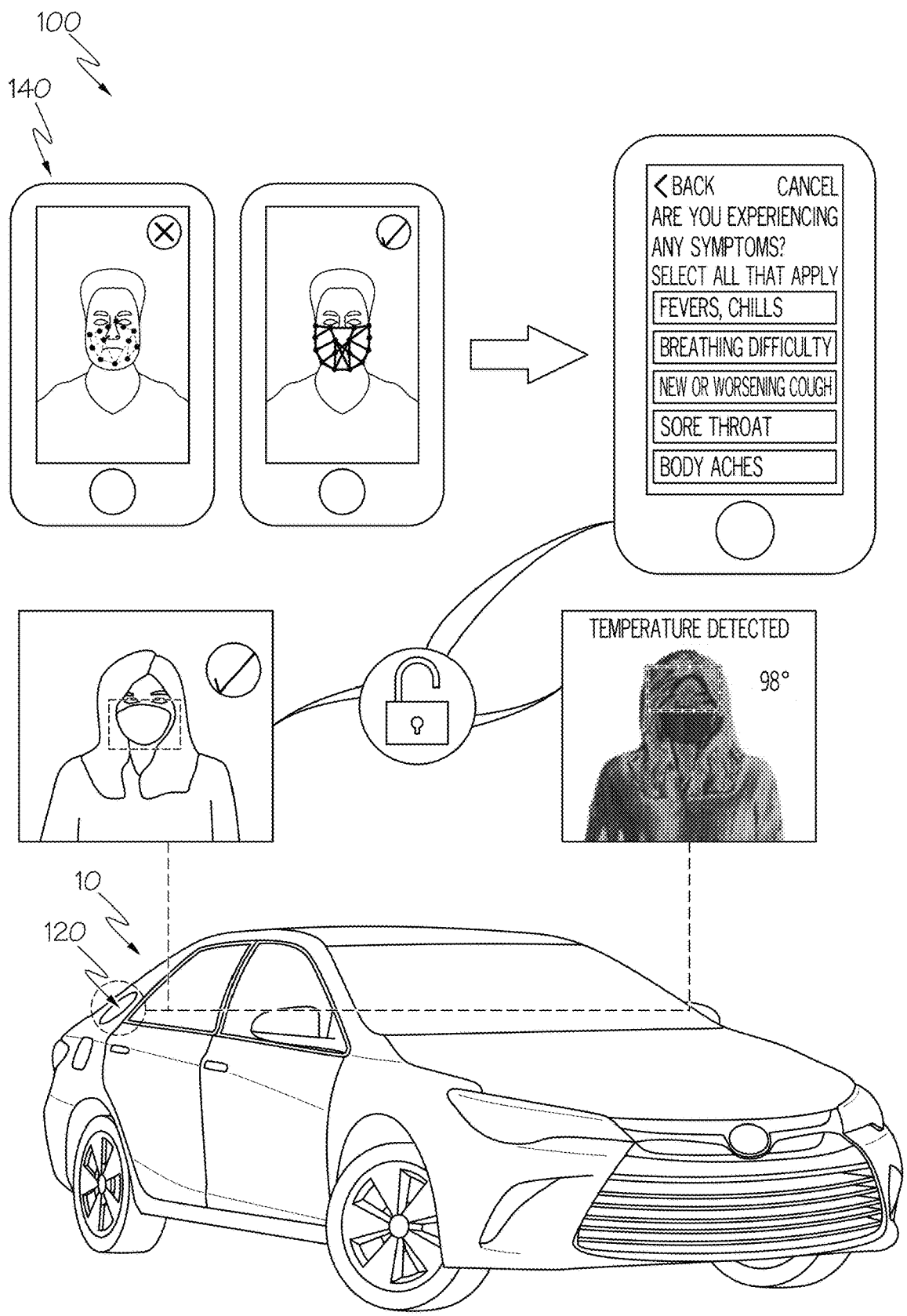
FIG. 2 schematically depicts a remote computing device and a vehicle including the vehicle system of FIG. 1, according to one or more embodiments shown and described herein.

Referring to FIGS. 1 and 2, a perspective view of a vehicle 10 including the one or more vehicle sensors 120 is schematically depicted. In some embodiments, the one or more vehicle sensors 120 are positioned on the body of vehicle 10. The one or more vehicle sensors 120 may include a detection device structurally configured to detect conditions around an exterior of the vehicle 10. The one or more vehicle sensors 120 can include, for example and without limitation, a photographic camera, an infrared camera, and/or the like. In embodiments, the one or more vehicle sensors 120 are communicatively coupled to the controller 110 such that the one or more vehicle sensors 120 can send signals to and/or receive signals from the controller 110.

The one or more remote computing devices 140 can include personal computers, laptops, mobile devices, tablets, phablets, mobile devices, or the like and may be utilized to interface with a user. In embodiments, the one or more remote computing devices 140 include a detection device structurally configured to detect conditions of a user, and may include for example and without limitation a photographic camera, an infrared camera, and/or the like.

In some embodiments, the one or more biometric sensors 142 are communicatively coupled to the controller 110. In the embodiment depicted in FIG. 1, the one or more biometric sensors 142 are communicatively coupled to the one or more remote computing devices 140, which are communicatively coupled to the controller 110. In other words, the one or more biometric sensors 142 are communicatively coupled to the controller 110 through the one or more remote computing devices 140 in the embodiment depicted in FIG. 1, however, it should be understood that this is merely an example. In some embodiments, the one or more biometric sensors 142 may be communicatively coupled to the controller 110 directly. In some embodiments, the one or more biometric sensors 142 may be incorporated within the one or more remote computing devices 140 or may be incorporated within wearable devices communicatively coupled to the one or more remote computing devices 140. The one or more biometric sensors 142 may be communicatively coupled to or incorporated within the one or more vehicle sensors 120. In embodiments, the one or more biometric sensors 142 are communicatively coupled to the controller 110 (either directly or through the one or more remote computing devices 140 and/or the one or more vehicle sensors 120) such that the one or more biometric sensors 142 can send signals to and/or receive signals from the controller 110.

The one or more biometric sensors 142 may include any sensor or sensors suitable for obtaining biometric data from a user, for example and without limitation, pulse sensors, pulse oximeters, blood pressure detection sensors, temperature sensors, and/or the like. In embodiments, the one or more biometric sensors 142 detect at least one of the user's body temperature, respiration rate, blood pressure, and blood oxygen saturation.

In embodiments, the one or more door locks 122 are communicatively coupled to the controller 110 such that the one or more door locks 122 can receive signals from and/or send signals to the controller 110. The one or more door locks 122, in embodiments, are positionable between a locked position and an unlocked position. In the locked position, the one or more door locks 122 may generally restrict entry into the vehicle 10 through the doors of the vehicle 10. In the unlocked position, the one or more door locks 122 allow entry into the vehicle 10 through the doors of the vehicle 10.

In some embodiments, the vehicle system 100 includes the interface 130 communicatively coupled to the controller 110. The interface 130, in some embodiments, the interface 130 is communicatively coupled to the controller 110 such that the interface 130 can send signals to and/or receive signals from the controller 110. The interface 130, in embodiments may display information related to the operation of the vehicle system 100, and may include for example and without limitation, a graphical user interface (GUI), or the like. In some embodiments, the interface 130 may be positioned within an interior of the vehicle 10, for example on an instrument panel or other suitable location within the vehicle 10. In some embodiments, the interface 130 may be positioned external to the vehicle 10. While reference is made herein to a single interface 130, it should be understood that this is merely an example, and in embodiments described herein, multiple interfaces 130 may be communicatively coupled to the controller 110.

Figure 3:
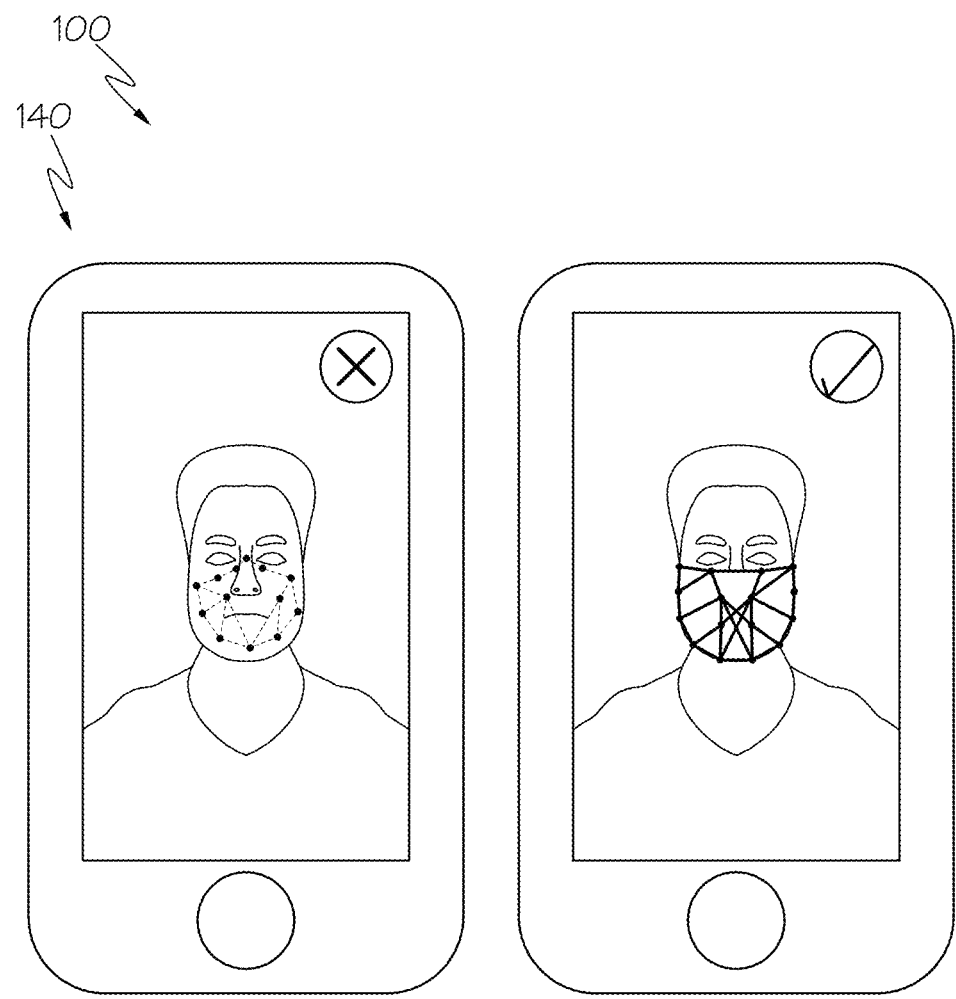
FIG. 3 schematically depicts example screen displays of the remote computing device of FIG. 2, according to one or more embodiments shown and described herein.

Referring to FIGS. 1-3, in embodiments the detection device of the one or more remote computing devices 140 and/or the detection device of the one or more vehicle sensors 120 can be used to detect whether a prospective passenger is wearing protective equipment.

In some embodiments, the detection device of the one or more remote computing devices 140 captures an image of the user. The one or more remote computing devices 140, either alone or in conjunction with the controller 110 can determine whether the user is wearing protective equipment. As described above, the one or more vehicle sensors 120 and/or the one or more remote computing devices 140 include a detection device structurally configured to detect an image, such as a photographic camera or the like. The detection device of the one or more vehicle sensors 120 and/or the detection device of the one or more remote computing devices 140 are communicatively coupled to the controller 110 such that the detection device can send signals to the controller 110, for example, signals indicative of images captured by the detection device. In some embodiments, the detection device of the one or more vehicle sensors 120 and/or the detection device of the one or more remote computing devices 140 may send signals to the controller 110 indicative of whether the user is wearing protective equipment.

As one example the one or more remote computing devices 140 captures an image of a user. The one or more remote computing devices 140, in some embodiments, analyzes the captured image, determining whether the captured image indicates that the user is wearing protective equipment. In some embodiments, the one or more remote computing devices 140 may include image recognition software or the like that allows the one or more remote computing devices 140 to analyze the captured image to confirm whether the user is wearing protective equipment. In the example depicted in FIGS. 2 and 3, the one or more remote computing devices 140 determines whether the captured image includes protective equipment worn by the user by determining whether the user is wearing a mask covering the nose and mouth of the user. In some embodiments, the one or more remote computing devices 140 sends a signal to the controller 110 indicating that the user is wearing protective equipment and/or is wearing the protective equipment properly. The controller 110, in response to receiving the signal from the one or more remote computing devices 140 determines that the user is wearing protective equipment and/or is wearing the protective equipment properly.

In some embodiments, the controller 110 analyzes the image captured by the one or more remote computing devices 140. For example, in some embodiments, the one or more remote computing devices 140 captures an image of the user, and transmits the image of the user to the controller 110 for analysis. In these embodiments, the controller 110 analyzes the captured image to confirm whether the user is wearing protective equipment. For example, in some embodiments, the controller 110 includes image recognition software or the like that allows the controller 110 to confirm whether the user is wearing protective equipment. In the example shown in FIGS. 2 and 3, the controller 110 analyzes the captured image to determine whether the captured image includes protective equipment worn by the user by determining whether the user is wearing a mask covering the nose and mouth of the user.

In some embodiments, the detection device of the one or more vehicle sensors 120 captures an image of the user. The one or more vehicle sensors 120, for example, captures an image of the user, and transmits the image of the user to the controller 110. The controller 110, may be configured to analyze the captured image to confirm whether the user is wearing protective equipment. In these embodiments, the controller 110 includes image recognition software or the like that allows the controller 110 to confirm whether the user is wearing protective equipment. In the example shown in FIG. 2, the controller 110 analyzes the captured image to determine whether the captured image includes protective equipment worn by the user by determining whether the user is wearing a mask covering the nose and mouth of the user.

In this way, via the one or more remote computing devices 140 and/or the one or more vehicle sensors 120, the vehicle system 100 can determine whether a user is wearing protective equipment. In embodiments in which the vehicle 10 is for hire (e.g., as a taxi, a rideshare, or the like), the one or more remote computing devices 140 may be utilized to determine the user is wearing protective equipment before the vehicle 10 can be summoned to the user's location. In response to determining that a captured image from the detection device of the one or more remote computing devices 140, the controller 110 directs the vehicle 10 to the user's location. Once the vehicle 10 arrives at the user's location, the one or more vehicle sensors 120 can be utilized to confirm that the user is wearing protective equipment before the user is permitted to access the vehicle 10.

In response to determining that the captured image (from the one or more remote computing devices 140 and/or the one or more vehicle sensors 120) indicates that the user is wearing protective equipment that meets a configurable protective equipment baseline, the controller 110 directs the one or more door locks 122 to move from the locked position to the unlocked position. In some embodiments, the configurable protective equipment baseline includes a mask covering the user's nose and mouth. With the one or more door locks 122 in the unlocked position, the user may enter the vehicle 10.

In response to determining that the captured image (from the one or more remote computing devices 140 and/or the one or more vehicle sensors 120) indicates that the user is not wearing protective equipment meeting the configurable protective equipment baseline, the controller 110 directs the one or more door locks 122 to move to or remain in the locked position. With the one or more door locks 122 in the locked position, the user's access to the vehicle 10 is restricted. In this way, the vehicle system 100 can selectively restrict access to the vehicle 10 to users wearing protective equipment that meets the configurable protective equipment baseline.

In embodiments, the configurable protective equipment baseline can be determined based on a variety of factors. In some embodiments and referring to FIGS. 1 and 2, controller 110 receives data from the one or more biometric sensors 142, and determines the configurable protective equipment baseline based at least in part on the data from the one or more biometric sensors 142. As noted above, the one or more biometric sensors 142 are structurally configured to detect at least one of the user's body temperature, respiration rate, blood pressure, and blood oxygen saturation. In embodiments, anomalies in any of the user's body temperature, respiration rate, blood pressure, and blood oxygen saturation can be indicative that the user has contracted a contagion.

For example, detection of any of a user's body temperature, respiration rate, blood pressure, and blood oxygen saturation outside of predetermined thresholds may be indicative that the user has contracted a contagion. Accordingly, by determining the protective equipment baseline based at least in part on data from the one or more biometric sensors 142, the configurable protective equipment baseline can be tailored to the likely health conditions of the user. In some embodiments, in response to receiving data from the one or more biometric sensors 142 indicating an anomaly (e.g., data outside of a predetermined threshold) in one or more of the user's body temperature, respiration rate, blood pressure, and blood oxygen saturation, the controller 110 may increase the configurable protective equipment baseline.

More particularly, the controller 110 may increase the configurable protective equipment baseline, thereby requiring a higher degree of protective equipment before allowing a user entry into the vehicle 10. In response to receiving data from the one or more biometric sensors 142 indicating an anomaly (e.g., data outside of a predetermined threshold) in one or more of the user's body temperature, respiration rate, blood pressure, and blood oxygen saturation, the controller 110 directs the one or more door locks 122 to move to or remain in the locked position.

In some embodiments, increasing the configurable protective equipment may include requiring multiple facemasks covering the user's face and mouth (as compared to requiring a single facemask covering the user's face and mouth). In some embodiments, increasing the configurable threshold may include requiring a facemask covering the user's face and mouth and gloves (as compared to solely requiring a facemask covering the user's face and mouth). In some embodiments, increasing the configurable threshold may include requiring a facemask with increased effectiveness (e.g., a N95 mask or the like as compared to a cloth mask). In some embodiments, increasing the configurable threshold may include determining that the user cannot enter the vehicle 10. For example, in some embodiments, in response to receiving data from the one or more biometric sensors 142 indicating an anomaly, the controller 110 may determine the configurable protective equipment baseline exceeds practical protective equipment limits, and may direct the one or more door locks 122 to move into or remain in the locked position such that the user is not admitted to enter the vehicle 10.

Figure 4:
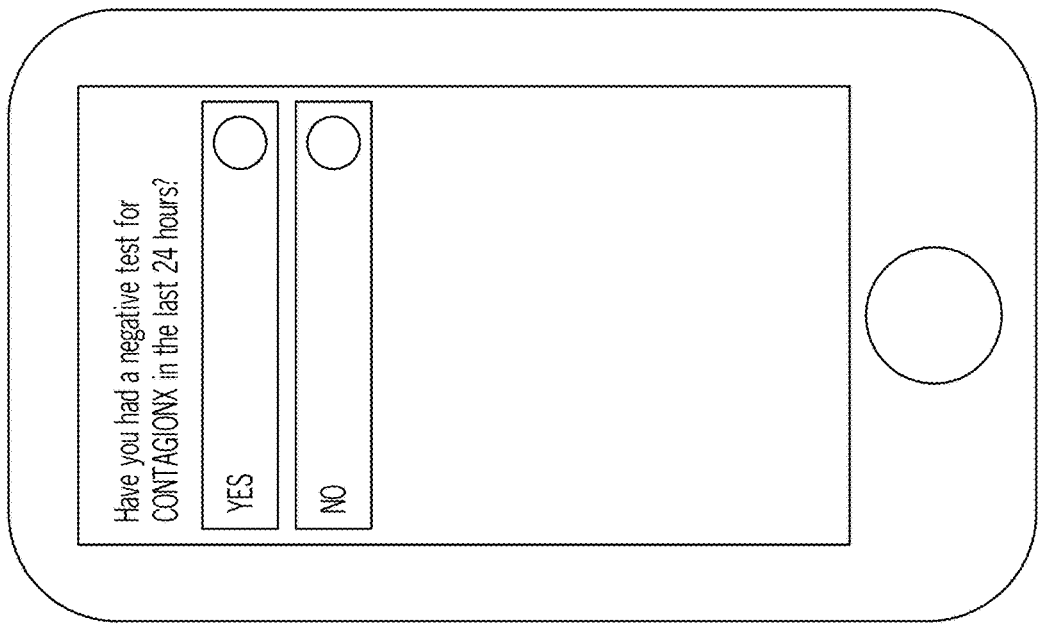
FIG. 4 schematically depicts another example screen display of the remote computing device of FIG. 2, according to one or more embodiments shown and described herein.
Figure 8:
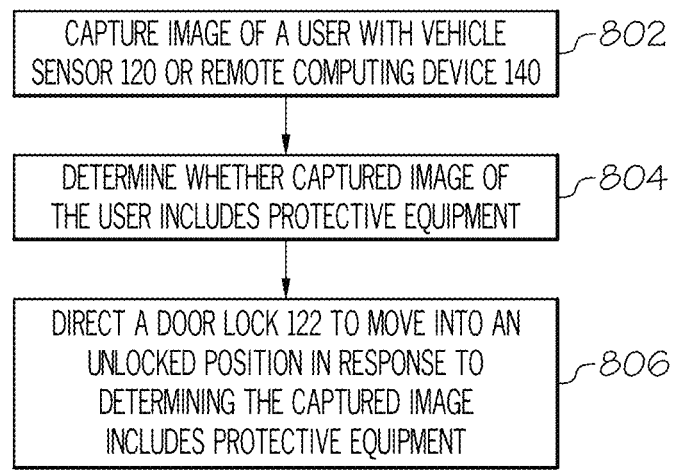
FIG. 8 is a flowchart of one method for operating the vehicle system of FIG. 1, according to one or more embodiment shown and described herein.
Figure 9:
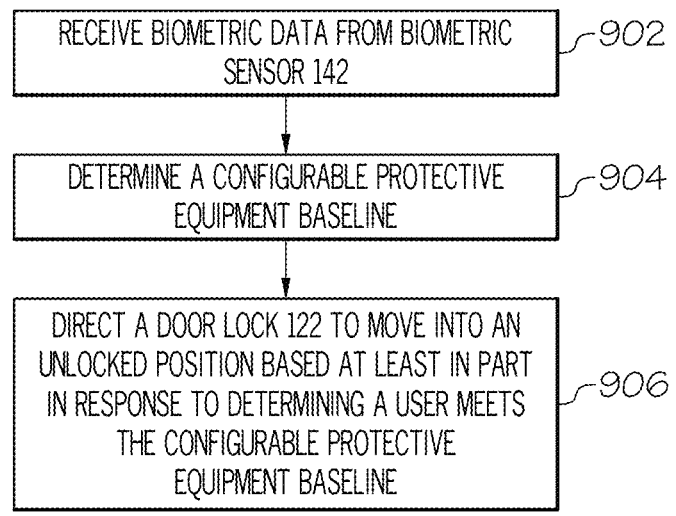
FIG. 9 is a flowchart of another method for operating the vehicle system of FIG. 1, according to one or more embodiments shown and described herein.

In some embodiments and referring to FIGS. 1 and 4-7, the vehicle system 100 prompts a user to answer a series of questions. As shown in FIG. 4, the one or more remote computing devices 140 may prompt a user to indicate whether the user has had a negative test for "CONTAGIONX" in the last 24 hours. In embodiments, the one or more remote computing devices 140 receives user input indicating whether the user has had a negative test for "CONTAGIONX" in the past 24 hours. As used herein, the term "CONTAGIONX" as used herein may refer to any transmissible contagion. Upon receiving user input from the user, the one or more remote computing devices 140, in some embodiments, transmits the received user input to the controller 110.

Figure 5:
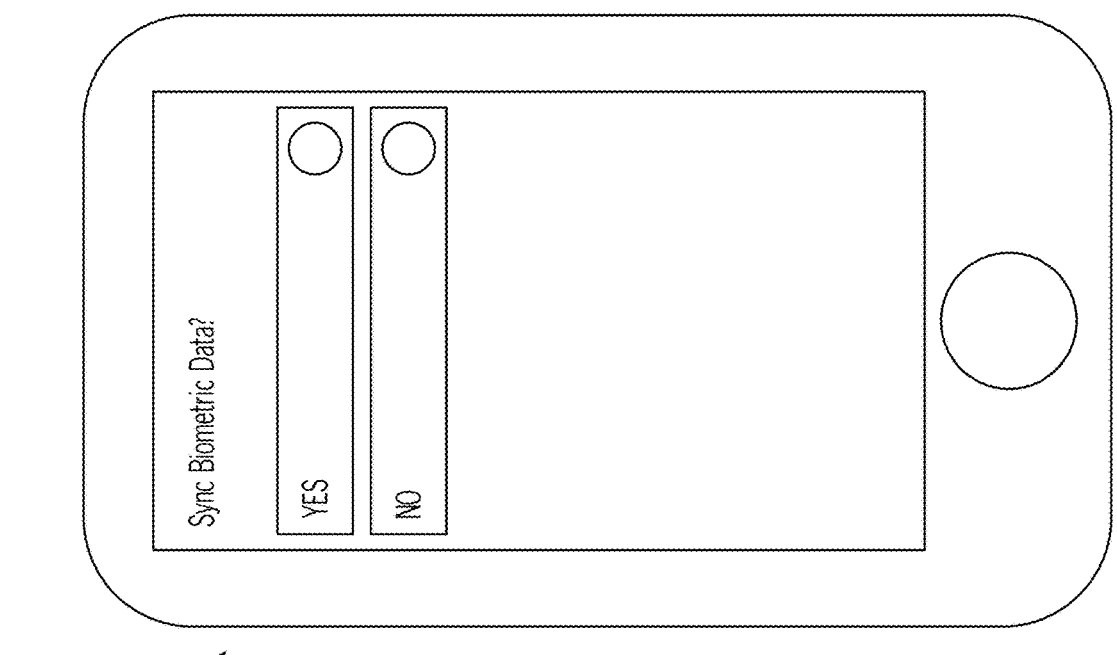
FIG. 5 schematically depicts another example screen display of the remote computing device of FIG. 2, according to one or more embodiments shown and described herein.

In some embodiments and referring to FIGS. 1 and 5, the one or more remote computing devices 140 prompts a user to access or synch biometric data. In embodiments in which the one or more biometric sensors 142 are communicatively coupled to or incorporated within the one or more remote computing devices 140, the one or more remote computing devices 140 may prompt a user to allow the controller 110 to access data from the one or more biometric sensors 142.

Figures 6, 7:
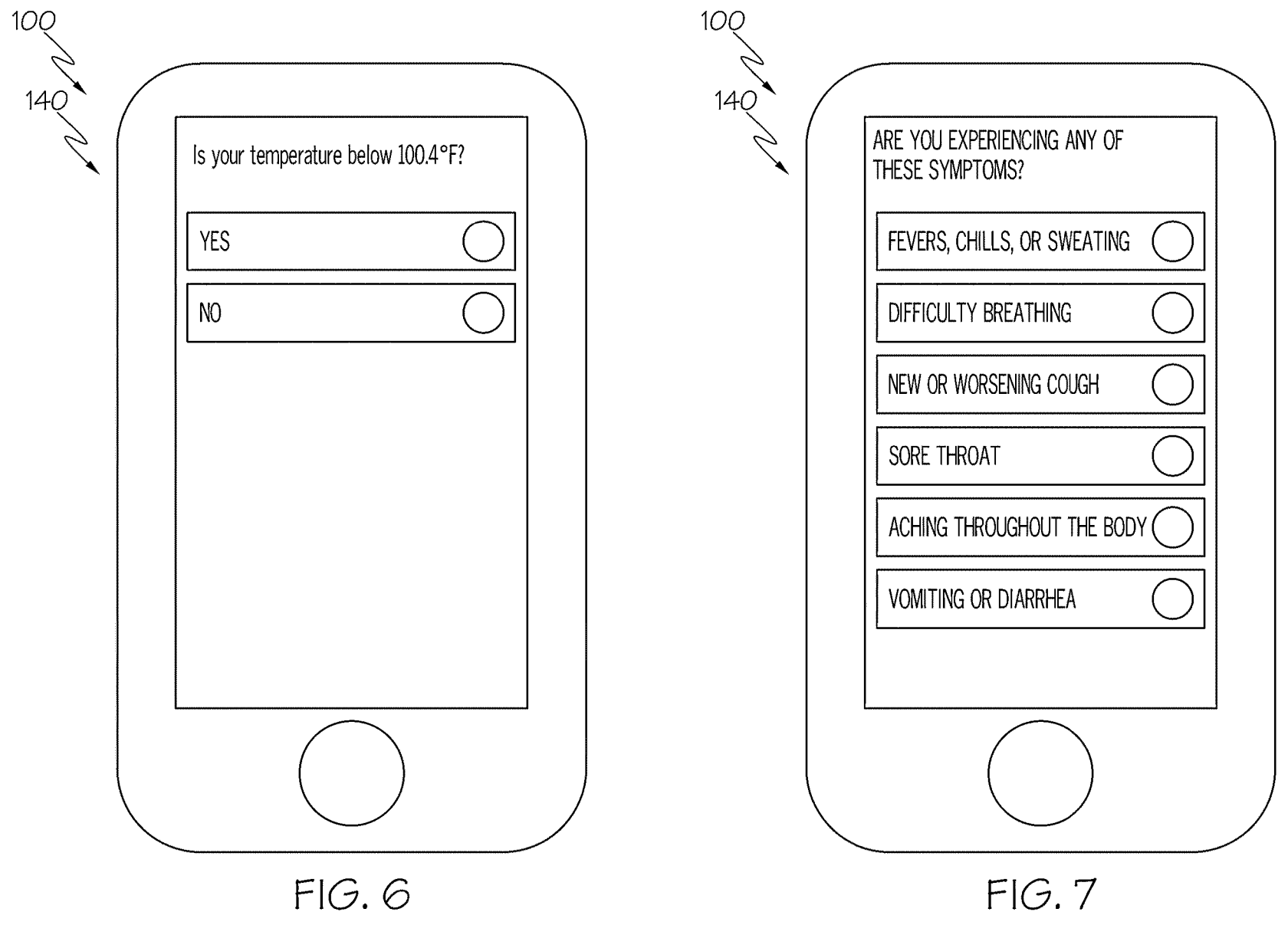

In some embodiments and referring to FIGS. 1, 6 and 7, the one or more remote computing devices 140 prompts a user to answer one or more health-related questions. In the example shown in FIG. 6 the one or more remote computing devices 140 prompts the user to indicate whether the user's temperature is below 110.4° F. In the example shown in FIG. 7 the one or more remote computing devices 140 prompts the user to indicate if they are experiencing any of a number of symptoms (e.g., fever, chills, or sweating, difficulty breathing, new or worsening cough, sore throat, aching throughout the body, and vomiting or diarrhea). The controller 110 receives user input data from the one or more remote computing devices 140. In some embodiments, the controller 110 determines the configurable protective equipment baseline based at least in part on the received input data from the remote computing device.

In response to receiving user input indicating that the user has had a negative test for CONTAGIONX within the last 24 hours (FIG. 4), the controller 110 may determine the configurable protective equipment baseline to be a mask covering the user's nose and mouth. In response to receiving user input indicating that the user has not had a negative test for CONGTAGIONX within the last 24 hours (FIG. 4), in some embodiments, the controller 110 may increase the configurable protective equipment baseline (e.g., requiring multiple masks, a mask and glove, an N95 mask, and/or determine the configurable protective equipment baseline exceeds practical protective equipment limits).

In response to receiving user input indicating that the user is not experiencing symptoms of illness (FIG. 7) and/or that the user's temperature is within a predetermined temperature (FIG. 6), the controller 110 may determine the configurable protective equipment baseline to be a mask covering the user's nose and mouth. In response to receiving user input indicating that the user is experiencing symptoms of illness (FIG. 7) and/or that the user's temperature is above the predetermined temperature (FIG. 6) the controller 110 may increase the configurable protective equipment baseline (e.g., requiring multiple masks, a mask and glove, an N95 mask, and/or determine the configurable protective equipment baseline exceeds practical protective equipment limits).

Referring to FIGS. 1-8, a flowchart for one method for operating the vehicle system 100 is depicted. In a first block 802, an image is captured of a user with the one or more vehicle sensors 120 or the one or more remote computing devices 140. At block 804, it is determined whether the captured image of the user include protective equipment meeting the configurable protective equipment baseline, for example via the controller 110. At block 806, in response to determining the captured image includes protective equipment meeting the configurable protective equipment baseline, the controller 110 directs the one or more door locks 122 to move into the unlocked position.

Referring to FIGS. 1-7 and 9, a flowchart for another method for operating the vehicle system 100 is depicted. In a first block 902, biometric data from the one or more biometric sensors 142 is received, for example, by the controller 110. At block 904, the configurable protective equipment baseline is determined, for example, by the controller 110. At block 906, at least in part in response to determining a user meets the configurable protective equipment baseline, the one or more door locks 122 are directed to move into the unlocked position, for example by the controller 110.

Accordingly, it should now be understood that embodiments described herein are directed to vehicle systems and methods for confirming protective equipment worn by a prospective passenger. By verifying the protective equipment worn by prospective passengers, the risk associated with the transmission of contagion within the vehicle can be reduced.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the appended claims should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A vehicle system comprising:
    a detection device structurally configured to capture an image;
    a biometric sensor, the biometric sensor is structurally configured to detect at least one of a user's body temperature, respiration rate, blood pressure, and blood oxygen saturation;
    a door lock, wherein the door lock is positionable between a locked position and an unlocked position;
    a controller communicatively coupled to the detection device, the biometric sensor, and the door lock, the controller comprising a processor and a non-transitory computer readable and executable instruction set, which when executed, causes the processor to:
        receive a captured image of the user from the detection device;
        receive biometric data from the biometric sensor;
        set a configurable protective equipment baseline based at least in part on the biometric data from the biometric sensor;
        determine whether the captured image of the user includes protective equipment worn by the user; and
        direct the door lock to move into the unlocked position in response to determining that the protective equipment in the captured image meets the configurable protective equipment baseline.

2. The vehicle system of claim 1, wherein the configurable protective equipment baseline comprises a mask covering a user's nose and mouth.

3. The vehicle system of claim 1, wherein the non-transitory computer readable and executable instruction set, when executed, further causes the processor to:
    determine whether the biometric data from the biometric sensor is outside of a predetermined threshold; and
    in response to determining that the biometric data from the biometric sensor is outside of the predetermined threshold, increase the configurable protective equipment baseline.

4. The vehicle system of claim 1, wherein the non-transitory computer readable and executable instruction set, when executed, further causes the processor to:
    determine whether the biometric data from the biometric sensor is outside of a predetermined threshold; and
    in response to determining that the biometric data from the biometric sensor is outside of the predetermined threshold, direct the door lock to remain in the locked position.

5. The vehicle system of claim 1, wherein the detection device is incorporated within a vehicle sensor positioned on a body of a vehicle.

6. The vehicle system of claim 5, further comprising a second detection device incorporated within a remote computing device, wherein the non-transitory computer readable and executable instruction set, when executed, further causes the processor to:
- receive a captured image of the user from the second detection device;
- determine whether the captured image from the second detection device of the user includes the protective equipment worn by the user; and
- in response to determining that the captured image from the second detection device includes the protective equipment worn by the user, direct the vehicle to the user's location.

7. The vehicle system of claim 1, wherein the non-transitory computer readable and executable instruction set, when executed, further causes the processor to:
- receive user input data from a remote computing device communicatively coupled to the controller; and
- determine the configurable protective equipment baseline based at least in part on the received user input data from the remote computing device.

8. A method for providing access to a vehicle, the method comprising:
- capturing an image of a user with a detection device;
- detecting at least one of the user's body temperature, respiration rate, blood pressure, and blood oxygen saturation with a biometric sensor;
- setting a configurable protective equipment baseline based at least in part on biometric data from the biometric sensor;
- determining whether the captured image of the user includes protective equipment worn by the user; and
- directing a door lock to move into an unlocked position in response to determining that the protective equipment in the captured image meets the configurable protective equipment baseline.

9. The method of claim 8, wherein the configurable protective equipment baseline comprises a mask covering a user's nose and mouth.

10. The method of claim 8, further comprising:
- determining whether the biometric data from the biometric sensor is outside of a predetermined threshold; and
- in response to determining that the biometric data from the biometric sensor is outside of the predetermined threshold, increasing the configurable protective equipment baseline.

11. A vehicle system comprising:
a biometric sensor structurally configured to detect at least one of a user's body temperature, respiration rate, blood pressure, and blood oxygen saturation;
a door lock, wherein the door lock is positionable between a locked position and an unlocked position;
a controller communicatively coupled to the biometric sensor and the door lock, the controller comprising a processor and a non-transitory computer readable and executable instruction set, which when executed, causes the processor to:
- receive biometric data from the biometric sensor;
- set a configurable protective equipment baseline based at least in part on the biometric data from the biometric sensor; and
- direct the door lock to move into the unlocked position based at least in part on a user meeting the configurable protective equipment baseline.

12. The vehicle system of claim 11, wherein the configurable protective equipment baseline comprises a mask covering a user's nose and mouth.

13. The vehicle system of claim 11, wherein the biometric sensor is communicatively coupled to a remote computing device.

14. The vehicle system of claim 11, further comprising a detection device structurally configured to detect an image, wherein the detection device is communicatively coupled to the controller.

15. The vehicle system of claim 14, wherein the non-transitory computer readable and executable instruction set, when executed, further causes the processor to:
- receive a captured image of the user from the detection device; and
- determine whether the captured image of the user includes protective equipment worn by the user.

\* \* \* \* \*